US007845169B2

(12) United States Patent
Brickner et al.

(10) Patent No.: US 7,845,169 B2
(45) Date of Patent: Dec. 7, 2010

(54) DRIFT COMPENSATION CONTROL METHOD FOR A MACHINE

(75) Inventors: Chad T. Brickner, Aurora, IL (US); Philip F. Lange, Herbeys (FR); Dominik Skwarnicki, Chicago, IL (US)

(73) Assignee: Caterpillar Inc, Peoria, IL (US)

( * ) Notice: Subject to any disclaimer, the term of this patent is extended or adjusted under 35 U.S.C. 154(b) by 1086 days.

(21) Appl. No.: 11/581,806

(22) Filed: Oct. 17, 2006

(65) Prior Publication Data

US 2008/0087163 A1 Apr. 17, 2008

(51) Int. Cl.
*F15B 9/10* (2006.01)
*F16D 33/00* (2006.01)

(52) U.S. Cl. .............................. 60/446; 60/459; 91/459

(58) Field of Classification Search .................. 60/445, 60/459, 467; 91/392, 419, 459
See application file for complete search history.

(56) References Cited

U.S. PATENT DOCUMENTS

| | | | | |
|---|---|---|---|---|
| 3,938,669 | A * | 2/1976 | Vinton | 212/272 |
| 4,951,549 | A * | 8/1990 | Olsen et al. | 91/459 |
| 5,230,272 | A * | 7/1993 | Schmitz | 91/459 |
| 5,743,165 | A * | 4/1998 | Tanaka et al. | 91/419 |
| 2005/0011190 | A1 | 1/2005 | Bitter | |
| 2006/0064971 | A1 | 3/2006 | Reedy et al. | |

* cited by examiner

*Primary Examiner*—Thomas E Lazo
(74) *Attorney, Agent, or Firm*—Liell & McNeil

(57) ABSTRACT

A method of controlling a machine having a hydraulically actuated linkage includes lowering a load suspended by the leakage at least in part by leaking hydraulic fluid from a portion of a hydraulic actuation system, and generating a drift compensation control signal responsive to leaking hydraulic fluid. A machine includes an electronic controller in control communication with a valve, the electronic controller being configured to compensate for leakage induced drift of at least one hydraulic actuator of a machine hydraulic system by selectively commanding adjusting of the valve if drift criteria for the hydraulic system are satisfied.

20 Claims, 2 Drawing Sheets

DRIFT COMPENSATION CONTROL METHOD FOR A MACHINE

TECHNICAL FIELD

The present disclosure relates generally to methods and apparatuses for controlling machines having hydraulic actuation systems, and relates more particularly to a method of compensating for actuator drift in a hydraulic system.

BACKGROUND

Hydraulic systems are used in a wide variety of machines, such as those used in construction, forestry and manufacturing. Over the years, a wide variety of sophisticated control systems and processes have been developed in an attempt to optimize the versatility, efficiency and overall operation of such hydraulic systems. Despite significant advances, a number of technical challenges continue to plague engineers when it comes to hydraulic system operation and control. One such challenge relates to a phenomenon known as "drift" in hydraulic actuation systems, particularly where the system is used to position and maintain a load at a specified position.

Drift may be understood as the tendency for an actuator, and hence a load positioned therewith, to unintentionally move from a commanded position over time due to leakage from or within the hydraulic system. Operators of certain machines such as loader machines, telehandlers, and similar devices will frequently be called upon to suspend a load at a desired height above the ground. Exemplary operations include accurately positioning a work implement, holding a load such as another machine at a lifted position for maintenance, or placing a load upon a structure. In many hydraulic systems, a certain degree of fluid leakage over time is well known to occur from one portion of the hydraulic system to another such as a fluid tank, or out of the hydraulic system all together. This sort of fluid leakage often results from internal component tolerances, typically necessary to allow freedom of movement. A certain amount of leakage may develop over time as the hydraulics are broken in, even in systems designed to exacting specifications.

A number of strategies addressing hydraulic actuator drift have developed over the years. One such approach utilizes a dedicated anti-drift valve. In one common anti-drift valve strategy, a pilot operated poppet valve is used to hydraulically lock a particular actuator such that fluid leakage is eliminated or at least reduced when the system is used to maintain a load at a specified position. While anti-drift valves have been relatively successful, they tend to have certain disadvantages, including slower cycle times and wasted energy due to pressure drop in the hydraulic system from valve actuation which must be compensated for by increasing hydraulic pressure and/or flow via the system pump. Anti-drift valves also tend to add cost and complexity to the overall system.

Other approaches have focused on tightening clearances of certain components within the hydraulic system to minimize fluid leakage. These strategies have also proven relatively successful, however, they are also accompanied by a number of disadvantages. For instance, tightening clearances on a main valve within a hydraulic system may result in valve sticking, where a valve component expands in response to temperature changes relatively faster than other components in the system. Using relatively tight clearances also tends to require relatively complex manufacturing processes, such as hard grinding, and matching a particular component such as a main valve to a particular hydraulic system. In other words, in systems machined to tight tolerances, it may be more difficult or impossible to random-fit the parts. There is thus a need for an improved means of compensating for leakage induced actuator drift in hydraulic systems.

A known approach to non-leakage induced perturbation of an actuator in a hydraulic system is known from United States Patent Application Publication No. 2005/0011190 A1 to Bitter ("Bitter"). Bitter provides a suspension system for the boom of a loading vehicle, having a hydraulic cylinder for raising and lowering the boom, which is controlled according to an active boom suspension process. Bitter utilizes a control valve to selectively route hydraulic oil to and from a chamber of the hydraulic cylinder. A position sensor is used to sense a position of the hydraulic piston rod, and sense when the rod is disturbed due to an inertial shock on the boom suspension system. A pressure-limiting unit separate from the main valve to the actuator is used to control fluid flow to and from the head-end chamber of the actuator such that the piston rod may be returned to an initial position following its shock-induced displacement. While Bitter may have applications in certain systems, the design is not well suited to remedying slower, undesired displacements of hydraulic cylinders, such as that induced by fluid leakage, and may not perform optimally, or at all, with certain hydraulic systems such as those having a pump with a margin control. Moreover, Bitter's use of a special pressure-limiting unit to achieve its goals increases cost, complexity and manufacturing practicability of the system.

The present disclosure is directed to one or more of the problems or shortcomings set forth above.

SUMMARY OF THE DISCLOSURE

In one aspect, the present disclosure provides a method of controlling a machine having a linkage coupled with a hydraulic actuation system. The method includes suspending a load with the linkage, and lowering the load, including leaking hydraulic fluid from at least a portion of the hydraulic actuation system. The method may further include sensing an operating parameter value during lowering the load, and generating a drift compensation control signal responsive to leaking hydraulic fluid.

In another aspect, the present disclosure provides a method of compensating for actuator drift in a hydraulic system. The method includes changing a position of at least one hydraulic actuator of the hydraulic system at least in part by leaking hydraulic fluid from the at least one hydraulic actuator responsive to a load thereon. The method may further include sensing an operating parameter value during changing the position of the at least one hydraulic actuator, and generating a drift compensation control signal responsive to leaking hydraulic fluid.

In still another aspect, the present disclosure provides a machine including a hydraulic system having a valve and at least one hydraulic actuator. An electronic controller is in control communication with the valve, and configured to compensate for leakage induced drift of the at least one hydraulic actuator by selectively commanding adjusting of the valve if actuator drift criteria are satisfied.

DETAILED DESCRIPTION

Figure 1:
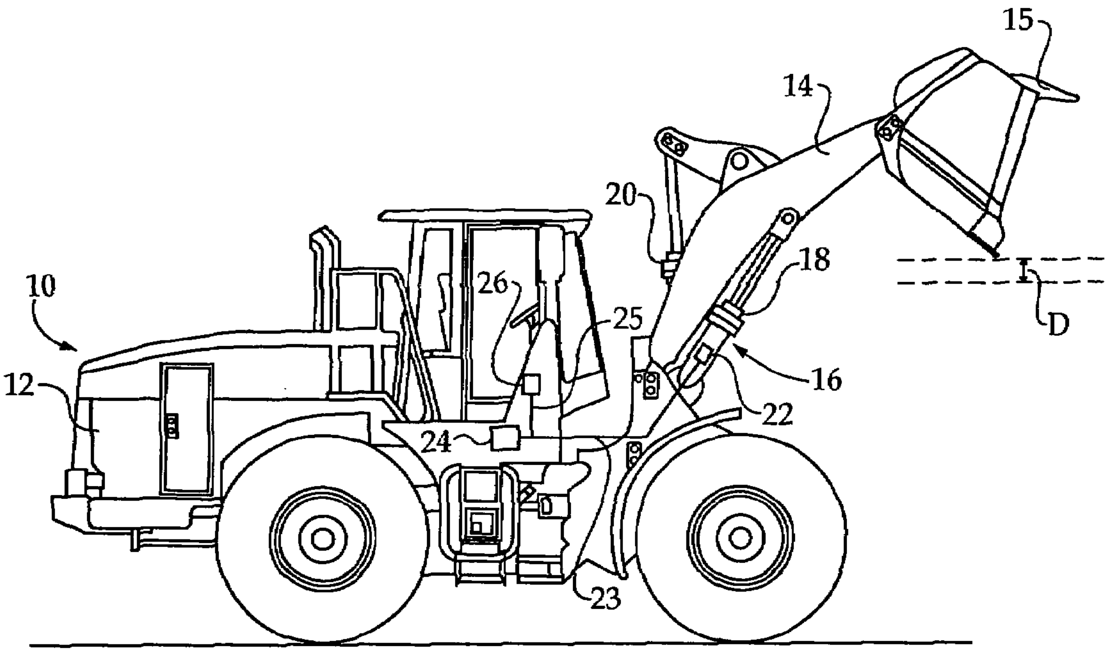
FIG. 1 is a side view of a machine having a hydraulic system coupled with a linkage according to one embodiment of the present disclosure.

Referring to FIG. 1, there is shown a machine 10 according to one embodiment of the present disclosure. Machine 10 includes a body 12, a linkage 14 and a bucket 15 coupled to linkage 14. A hydraulic actuation system 16 is coupled with linkage 14, and controllable via a drift compensation control method described herein such that a load positioned with linkage 14 may be maintained at or close to a specified position. Machine 10 is shown in the context of a wheel loader, however, it should be appreciated that a wide variety of machines and a wide variety of actuation systems fall within the fair scope of the present disclosure. For instance, machine 10 might be a telehandler, a backhoe, or a hydraulically actuated industrial apparatus or even a hydraulic lift or stabilizer. Linkage 14 may be used to support and suspend a load. It should be appreciated that the load supported with linkage 14 may be bucket 15 alone, bucket 15 and material positioned therein, or it might be a different load such as a different work implement or even a rock or steel girder suspended with linkage 14 via chains, for example. It should be appreciated that use herein of the term "suspended" should not be construed to mean that a load must depend downwardly from linkage 14, as linkage 14 might be used within the context of the present disclosure to support a load from below. Still other embodiments are contemplated, as further described herein.

Hydraulic actuation system 16 will typically include at least one hydraulic actuator 18 such as a linkage lift/raise actuator, and may include at least one other hydraulic actuator 20 such as a bucket tilt/dump actuator. In other embodiments, a conventional linkage may not be used at all, and the present system and process could be configured to support a load coupled directly to an actuator, and compensate for leakage induced drift therein. Thus, descriptions herein of linkage 14 should not be understood to limit the present disclosure to linkages of the type associated with construction machines such as machine 10.

A sensor 22 may be coupled with actuator 18 such that a relative position of linkage 14, and hence a relative position of a load suspended therewith, may be determined. Additional position sensors (not shown) might be included and coupled with actuator 20, or other actuators if more than two actuators are used in system 16. Rather than position sensors associated with the individual hydraulic actuators, a different type of position sensor such as a rotary position sensor coupled between movable parts of linkage 14 might be used. In other embodiments, optical sensors might be used to detect a position of components of linkage 14 or system 16, and thus a load positioned or suspended thereby. In still other embodiments, a sensor configured to detect fluid leakage directly from actuator 18 or a velocity sensor might be used.

Sensor 22 may be coupled with an electronic controller 24 via a communication line 23. Electronic controller 24 may be configured via a drift compensation control algorithm, for example a closed loop control algorithm, to compensate for leakage induced drift in hydraulic system 16. To this end, electronic controller 24 may comprise a computer readable medium such as RAM or ROM or another medium whereupon the subject control algorithm is recorded. Rather than a pure software-based system, however, some or all of the control operations described herein might be carried out via dedicated hardware. Where a closed loop control algorithm is implemented, the algorithm may comprise an input term corresponding with position inputs from sensor 22. An operator input device 26 may also be coupled with electronic controller 24 via another communication line 25. Operator input device 26 may be configured to output a drift compensation routine activation signal to electronic controller 24, and may also be configured to output a corresponding deactivation signal. The drift compensation control process carried out by electronic controller 30 may also be activated in an autonomous manner, for example, where a series of similar or identical control commands, or a predetermined control command sequence, are received which indicate desired maintaining of a load at a specified position via linkage 14. In certain embodiments, drift compensation control may be deactivated where deactivation criteria such as receipt of further commands from input device 26 occurs, operator commands exceeding a deadband position, or where the control routine times out.

Figure 2:
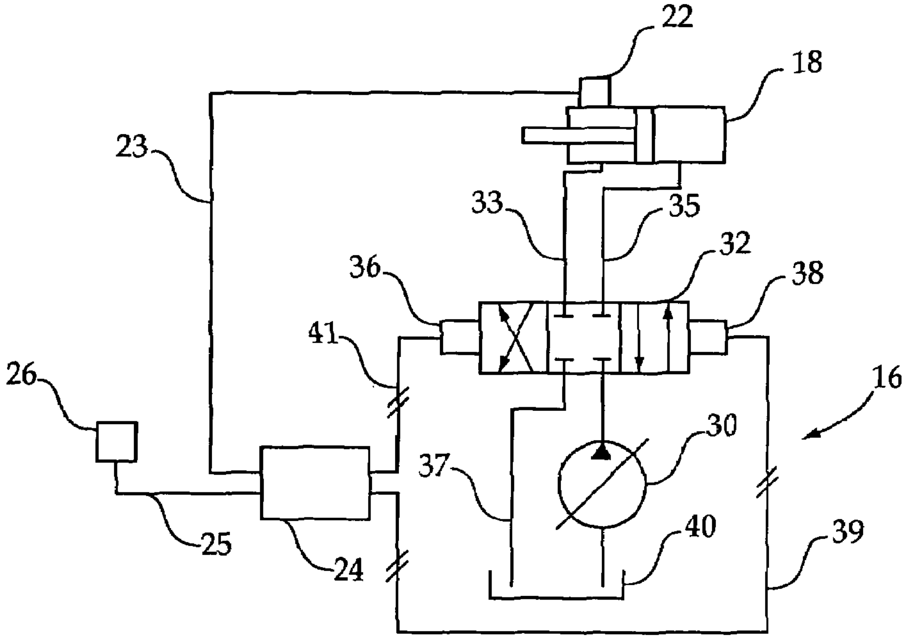
FIG. 2 is a schematic illustration of a hydraulic system in accordance with one embodiment of the present disclosure.

Turning to FIG. 2, there is shown hydraulic actuation system 16 coupled with electronic controller 24, and various other components similar to those shown in FIG. 1. System 16 may include a hydraulic pump 30 such as a variable discharge pump or a fixed displacement pump, configured to draw hydraulic fluid from a fluid tank 40 and supply the same to actuator 18 via fluid supply/discharge lines 33 and 35. A drain passage 37 may be provided to allow fluid returning from actuator 18 to pass to fluid tank 40. System 16 may further include a valve 32, which may be both of a fluid supply and discharge valve, and may further comprise a three-way valve, disposed between pump 30 and actuator 18. Valve 32 may be adjustable via first and second actuators 36 and 38, such as solenoid driven electrical actuators, hydraulic actuators or a different actuator type, in either of a first and a second direction, such that valve 32 may control fluid supply/discharge to and from actuator 18. In one embodiment, valve 32 may be biased toward a position at which fluid flow to and from actuator 18 is blocked, albeit some fluid leakage is expected to occur. Electronic controller 24 may be in control communication with each of actuators 36 and 38 via communication lines 41 and 39, respectively, such that its outputted drift compensation control signals may be received and valve 32 responsively adjusted.

The present disclosure contemplates any valve type for valve 32 which will allow fluid supply to be selectively initiated or increased to actuator 18 to compensate for drift thereof. In one embodiment, valve 32 may comprise a variable flow rate valve that is controlled via drift compensation control signals from electronic controller 24 to supply hydraulic fluid to actuator 18 at a selected pressure and/or flow rate. The pressure and/or flow rate to actuator 18 may be based at least in part on a difference between a specified, target position for actuator 18 and/or linkage 14 and/or a load suspended thereby and a sensed position. Thus, in one embodiment, sensor 22 may output signals associated with a position of actuator 18. Electronic controller 24 may be configured to compare the sensed position signals with signals expected for the target position, and responsively output a flow rate/pressure signal to valve 32.

Electronic controller 24 may further be configured to output a drift compensation control signal only when a difference between a sensed actuator, linkage or load position and the target position is greater than a predetermined amount. For instance, leaking of hydraulic fluid from actuator 18 past valve 32 may induce lowering of linkage 14, and hence lowering of bucket 15 and a load suspended therewith. In one contemplated embodiment, when bucket 15 is lowered a distance D, electronic controller 24 may output an appropriate drift compensation control signal to return linkage 14 toward the target position. The value of distance D may be varied based on operator or design preferences.

Following outputting of an initial drift compensation control signal, sensor 18 may continue to sense a position of actuator 18, and electronic controller 24 may continue to output subsequent drift compensation control signals to valve 32. The control signals may be flow rate/pressure control signals based on a comparison between the sensed position and the target position until a sensed position of actuator 18 is equal to or within an acceptable range of the target position. The target position for linkage 14, bucket 15, a load, etc. may be set by reading position signals from sensor 22, for example, responsive to activation of the drift compensation routine.

INDUSTRIAL APPLICABILITY

Figure 3:
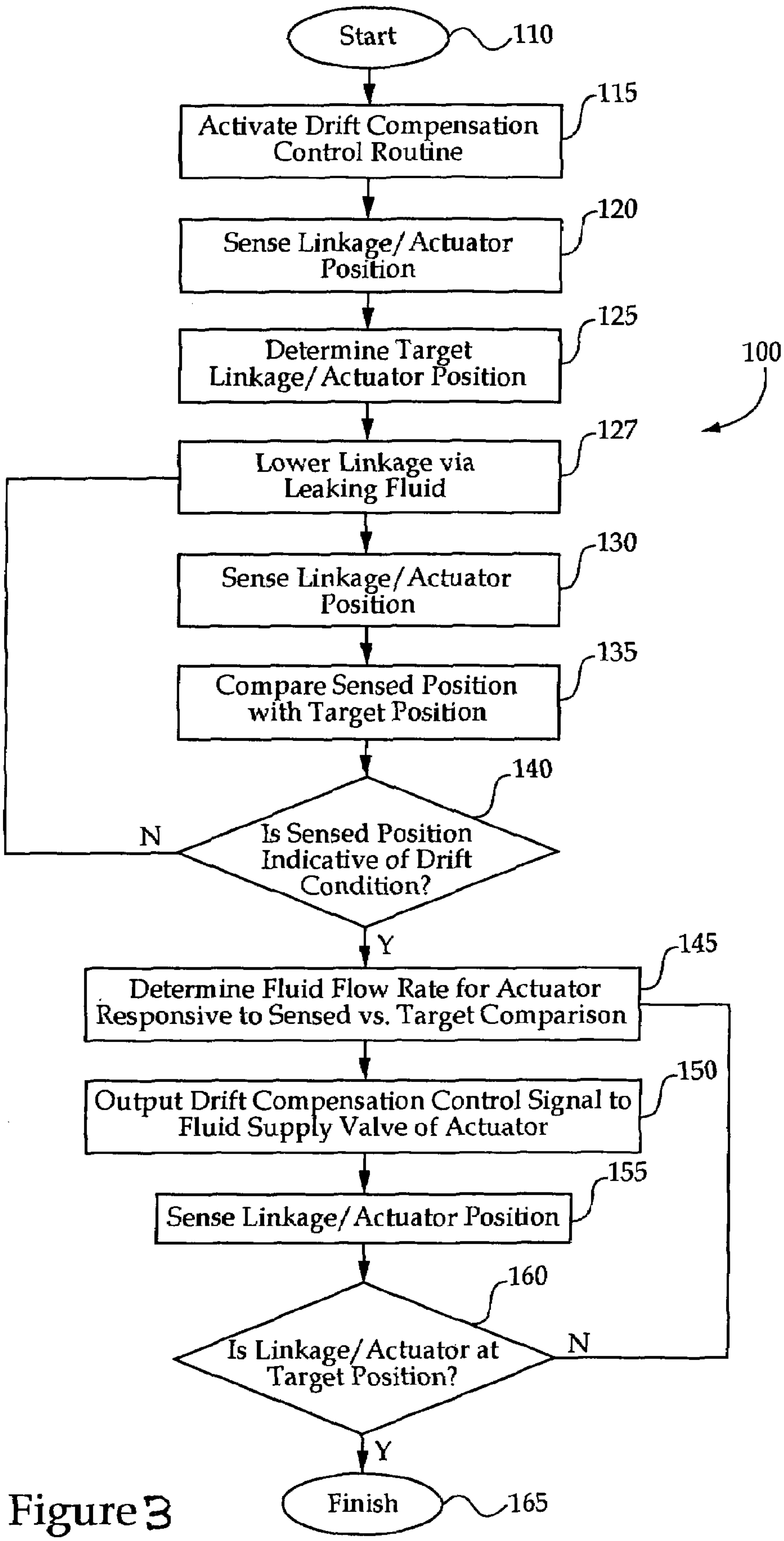
FIG. 3 is a flowchart illustrating a control process in accordance with one embodiment of the present disclosure.

Turning to FIG. 3, there is shown a flowchart illustrating a control process 100. Process 100 may begin at step 110, a START, and then proceed to step 115 wherein a drift compensation control routine may be activated. The drift compensation control routine of the present disclosure may be activated, for example, via a control command from input device 26, or it may be activated in an automated fashion, for example where linkage 14 is commanded at a constant position for a predetermined period of time. If valve 32 is not already in a closed position, substantially blocking fluid flow except for undesired leakage, it may be moved to a closed position. From step 115, process 100 may proceed to step 120 wherein sensor 22 may sense the position of linkage 14, as indicated by a position of actuator 18, responsive to activating the drift compensation control routine. From step 120, process 100 may proceed to step 125 wherein electronic controller 24 may determine a target linkage/actuator position, for example, the position sensed in step 120 which corresponds to an operator commanded position for the load supported/suspended via linkage 14.

From step 125, process 100 may proceed to step 127 wherein linkage 14 may be lowered via leaking hydraulic fluid from at least a portion of system 16. As contemplated herein, "lowering" of the load will take place apart from any operator command. In other words, in most embodiments, the present drift compensation strategy will be applicable where a load is lowered via unintended leaking of hydraulic fluid, not where lowering is commanded. The present disclosure is not thereby limited, however. Fluid may leak past valve 32 to tank 40, for example, or may leak from actuator 18 via a different pathway. From step 127, process 100 may proceed to step 130 to again sense linkage/actuator position, and thenceforth to step 135 wherein electronic controller 24 will compare the position sensed in step 130 with the target position determined in step 125. From step 135, process 100 may proceed to step 140 wherein electronic controller 24 may query whether the sensed position is indicative of a drift condition of actuator 18. Determining the existence of a drift condition may occur, for example, by determining if a sensed position of actuator 18 indicates that bucket 15 has been lowered distance D. If at step 140, the sensed position is not indicative of an actuator drift condition, then process 100 may return to step 127 to continue to sense actuator position until a drift condition is detected, or until the drift compensation routine is deactivated. If at step 140, sensed position of actuator 18 is indicative of a drift condition, process 100 may proceed to step 145.

At step 145, electronic controller 24 may determine a fluid flow rate for actuator 18 responsive to the comparison of sensed position with target position in step 135. In other words, electronic controller 24 may determine the fluid flow rate based on a difference between the position sensed in step 135 and the target position determined in step 125. Where the sensed position differs from the target position by a relatively greater degree, the commanded fluid flow rate may be relatively larger, whereas the fluid flow rate may be relatively lesser for a relatively smaller difference between the sensed and target positions. From step 145, process 100 may proceed to step 150 wherein electronic controller 24 may output a drift compensation control signal to fluid supply valve 32, e.g. a flow rate signal, to begin returning actuator 18 toward a position corresponding with the target position.

From step 150, process 100 may proceed to step 155 to once again sense linkage/actuator position. From step 155, process 100 may proceed to step 160 wherein electronic controller 24 may query whether the linkage/actuator is at the target position. If no, process 100 may return to step 145 to again determine a fluid flow rate to actuator 18 based on the difference between a sensed linkage/actuator position and the target position, and will thenceforth output a subsequent drift compensation control signal. The subsequent drift compensation control signal may correspond to a flow rate at valve 32 that is less than the flow rate commanded via the control signal output the first time the routine executes step 150, given an expected relatively lesser difference between the sensed actuator position and the target position. In this manner, process 100 may comprise a closed loop control process whereby progressively lesser flow rates at valve 32 are commanded as actuator 18 approaches a position corresponding with the target position. If in step 160, the linkage/actuator position is determined to be at a position corresponding to the target position, or within an acceptable tolerance thereof, process 100 may proceed to step 165 to FINISH.

The present disclosure thus provides significant advantages over known drift compensation strategies. Rather than a dedicated, separate anti-drift valve, adding complexity and expense to the overall hydraulic system, existing components may be used, albeit via a new control strategy. The present disclosure further provides a system and method superior to an approach wherein components of the hydraulic system are machined to exacting specifications, and must be matched to specifically corresponding systems, rather than random fit in mass production.

The present description suggests suspending a load with linkage 14 at a specified position, however, it should be appreciated that only one actuator or set of actuators in a hydraulic system might be controlled as described herein, while other actuators are allowed to freely adjust. For instance, in machine 10 of FIG. 1, it might be desirable in certain instances to position linkage 14 at a constant height, but allow relatively fine control over the position of a load via adjusting bucket 15 via actuator 20. In such an embodiment, the presently described drift compensation routine may be applied to actuator 18 only, while actuator 20 remains under operator or automated control.

The present description is for illustrative purposes only, and should not be construed to narrow the breadth of the present disclosure in any way. Thus, those skilled in the art will appreciate that various modifications might be made to the presently disclosed embodiments without departing from the intended spirit and scope of the present disclosure. For example, while hydraulic system 16 is shown in a context of a variable discharge hydraulic pump 30, the disclosure is not limited thereby. A fixed displacement pump, possibly coupled with a return line to tank 40 might be used. In still other embodiments, rather than a linkage coupled with a mobile machine such as machine 10, a stationary system such as a machine maintenance jack might be designed and controlled as taught herein. Other aspects, features and advantages will be apparent for an examination of the attached drawings and appended claims.

What is claimed is:

1. A method of controlling a machine having a linkage coupled with a hydraulic actuation system comprising the steps of:
- suspending a load with the linkage;
- lowering the load, including leaking hydraulic fluid from at least a portion of the hydraulic actuation system during suspending the load with the linkage;
- sensing an operating parameter value during lowering the load;
- generating an electronic drift compensation control signal responsive to leaking hydraulic fluid and subsequent to lowering the load;
- supplying a fluid to an hydraulic actuator of the hydraulic actuation system during suspending the load with the linkage; and
- adjusting at least one of a flow rate or pressure of the fluid being supplied to the hydraulic actuator, responsive to the drift compensation control signal.

2. The method of claim 1 wherein the sensing step comprises sensing an operating parameter value indicative of load position, wherein the generating step comprises generating a drift compensation control signal responsive to the sensed operating parameter value, and wherein the step of adjusting the flow rate or pressure further includes adjusting responsive to a difference between sensed load position and a target position.

3. The method of claim 2 further comprising a step of raising the load at least in part via a step of commanding adjusting an electronically controlled fluid supply valve associated with at least one actuator of the hydraulic actuation system via the drift compensation control signal.

4. The method of claim 3 wherein the step of sensing an operating parameter value comprises sensing actuator position with a position sensor coupled with the at least one actuator.

5. The method of claim 4 wherein the lowering step comprises lowering the load via lowering the linkage from a target linkage position, and wherein the raising step comprises a step of returning the linkage toward the target linkage position via adjusting of the fluid supply valve.

6. The method of claim 5 further comprising a step of determining the existence of a leakage induced actuator drift condition at least in part by comparing the sensed actuator position with a target actuator position corresponding to the target linkage position.

7. The method of claim 6 wherein the sensing step comprises sensing a first actuator position and the generating step comprises generating a first drift compensation control signal, the method further comprising the steps of:
- sensing a second actuator position, subsequent to generating the first drift compensation control signal;
- comparing the second actuator position with the target actuator position; and
- generating a second drift compensation control signal responsive to the comparison of the second actuator position with the target actuator position.

8. The method of claim 6 wherein the step of generating a drift compensation control signal comprises outputting a fluid flow rate control signal to adjust a fluid flow rate at the fluid supply valve responsive to the comparison of the sensed actuator position with the target actuator position.

9. The method of claim 2 wherein the linkage includes a plurality of linkage actuators, the method further comprising a step of generating a plurality of drift compensation control signals associated one with each of the plurality of linkage actuators, responsive to a leakage induced drift condition of each respective actuator.

10. The method of claim 2 wherein the linkage includes a plurality of linkage actuators, the method further comprising a step of controlling a position of a first linkage actuator via a drift compensation control signal generated responsive to a leakage induced drift condition of the first linkage actuator, and controlling a position of at least a second linkage actuator separately from controlling the position of the first linkage actuator.

11. The method of claim 2 further comprising the steps of:
- receiving with an electronic controller a request to activate a drift compensation routine;
- receiving with the electronic controller a request from an input device to adjust at least one actuator of the hydraulic system; and
- deactivating the drift compensation routine responsive to the request to adjust the at least one hydraulic cylinder, if the request satisfies drift compensation deactivation criteria.

12. A method of compensating for actuator drift in a hydraulic system comprising the steps of:
- changing a position of at least one hydraulic actuator of the hydraulic system at least in part by leaking hydraulic fluid from the at least one hydraulic actuator responsive to a load thereon;
- sensing an operating parameter value during changing the position of the at least one hydraulic actuator;
- generating an electronic drift compensation control signal responsive to leaking hydraulic fluid and responsive to sensing the operating parameter value; and
- decreasing at least one of a flow rate or a pressure of fluid being supplied to the at least one hydraulic actuator from a first level to a second level, in response to the drift compensation control signal.

13. The method of claim 12 further comprising the steps of commanding a target position for the at least one hydraulic actuator prior to the changing step, and returning the at least one hydraulic actuator toward the target position at least in part via the drift compensation control signal.

14. The method of claim 13 wherein the step of sensing an operating parameter value comprises sensing an operating parameter value that corresponds with a leakage induced drift condition of the at least one hydraulic actuator.

15. The method of claim 14 wherein the at least one hydraulic actuator comprises a linear hydraulic actuator, and wherein the step of sensing an operating parameter value comprises sensing a position of the linear hydraulic actuator with a position sensor coupled therewith.

16. The method of claim 15 wherein the drift compensation control signal comprises a flow rate control signal, the method further comprising a step of increasing fluid flow to the at least one actuator at least in part by outputting the flow rate control signal to an electronically controlled fluid supply valve associated with the at least one actuator, based on a difference between the target position and the sensed position.

17. A machine comprising:
- a hydraulic system having a valve and at least one hydraulic actuator;
- a sensor configured to sense an operating parameter indicative of a position of the at least one hydraulic actuator; and an electronic controller coupled with said sensor and in control communication with said valve, and configured to compensate for leakage induced drift of said at least one hydraulic actuator by selectively commanding adjusting of said valve if actuator drift criteria are satisfied; and said electronic controller being further configured by way of commanding adjusting said valve to increase at least one of a flow rate or a pressure of fluid supplied to said at least one hydraulic actuator if actuator drift criteria indicative of a first difference between a target actuator position and a sensed actuator position are satisfied; and said electronic controller being further configured by way of commanding adjusting said valve to decrease at least one of a flow rate or a pressure of fluid supplied to said at least one hydraulic actuator if actuator drift criteria indicative of a second difference between a target actuator position and a sensed actuator position are satisfied.

18. The machine of claim 17 wherein said sensor comprises a position sensor configured to sense a position of said at least one hydraulic actuator and output corresponding position signals to said electronic controller, wherein said electronic controller is configured to compensate for said leakage induced drift via a closed loop drift compensation control algorithm having an input term corresponding to position signal inputs from said sensor.

19. The machine of claim 18 wherein said electronic controller is further configured to determine satisfaction of actuator drift criteria at least in part by comparing a sensed position of said at least one hydraulic actuator with a target position.

20. The machine of claim 19 further comprising:

a plural component linkage coupled with said hydraulic system;

a plurality of linkage actuators; and an implement coupled with said linkage and configured to suspend a load;

wherein said valve comprises a primary fluid supply valve for at least one of said plurality of linkage actuators.

* * * * *